(12) United States Patent
Saito

(10) Patent No.: US 10,278,377 B2
(45) Date of Patent: May 7, 2019

(54) ROTATION TRANSMISSION MECHANISM FOR SPINNING REEL

(71) Applicant: Shimano Inc., Sakai, Osaka (JP)

(72) Inventor: Kei Saito, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 128 days.

(21) Appl. No.: 15/450,987

(22) Filed: Mar. 6, 2017

(65) Prior Publication Data

US 2017/0332614 A1    Nov. 23, 2017

(30) Foreign Application Priority Data

May 18, 2016  (JP) ................................. 2016-099944

(51) Int. Cl.
  *A01K 89/01*  (2006.01)
  *A01K 89/015*  (2006.01)
  *A01K 89/00*  (2006.01)

(52) U.S. Cl.
  CPC ...... *A01K 89/01902* (2015.05); *A01K 89/006* (2013.01); *A01K 89/01* (2013.01); *A01K 89/01928* (2015.05); *A01K 89/01931* (2015.05); *A01K 89/011221* (2015.05)

(58) Field of Classification Search
  CPC ............ A01K 89/01902; A01K 89/006; A01K 89/011223
  See application file for complete search history.

(56) References Cited

U.S. PATENT DOCUMENTS

| | | | | |
|---|---|---|---|---|
| 5,289,990 A | * | 3/1994 | Kawabe | A01K 89/01084 242/233 |
| 5,381,979 A | * | 1/1995 | Furomoto | A01K 89/006 242/224 |
| 5,690,289 A | * | 11/1997 | Takeuchi | A01K 89/006 242/282 |
| 6,626,385 B1 | * | 9/2003 | Tsutsumi | A01K 89/006 242/282 |

(Continued)

FOREIGN PATENT DOCUMENTS

| | | |
|---|---|---|
| EP | 1358795 A1 | 11/2003 |
| EP | 1894468 A1 | 3/2008 |

(Continued)

OTHER PUBLICATIONS

Extended European Search Report dated Oct. 19, 2017 for corresponding EP Application No. 17163454.6, 11 pp.

*Primary Examiner* — Emmanuel M Marcelo
(74) *Attorney, Agent, or Firm* — United IP Counselors, LLC

(57) ABSTRACT

A rotation transmission mechanism includes a drive shaft, a drive gear, a pinion gear, a first bearing, and a positioning structure. The drive shaft is rotatable with respect to a chassis. The drive gear is unitarily rotatable with the drive shaft. The pinion gear is rotatably mounted to the chassis and disposed in a skew direction to the drive shaft, the pinion gear meshed with the drive gear. The first bearing is mounted to the chassis, is disposed between the chassis and the drive shaft, and rotatably supports the drive shaft. The positioning structure is mounted to an end of the drive shaft, and positions the drive shaft with respect to the first bearing.

12 Claims, 4 Drawing Sheets

(56) References Cited

U.S. PATENT DOCUMENTS

| | | | | |
|---|---|---|---|---|
| 2003/0111569 A1* | 6/2003 | Hitomi | ............ | A01K 89/01122 242/321 |
| 2003/0205637 A1* | 11/2003 | Nakajima | ............ | A01K 89/006 242/283 |
| 2004/0140385 A1* | 7/2004 | Nishikawa | ............ | A01K 89/006 242/283 |
| 2006/0071107 A1* | 4/2006 | Ochiai | ................ | A01K 89/006 242/283 |
| 2010/0301150 A1* | 12/2010 | Law | .................... | A01K 89/006 242/283 |
| 2014/0027555 A1* | 1/2014 | Takamatsu | ............ | A01K 89/01 242/283 |
| 2015/0090819 A1* | 4/2015 | Shimizu | ................ | A01K 89/01 242/241 |
| 2015/0115087 A1* | 4/2015 | Ohara | ................ | F16C 32/0406 242/223 |
| 2016/0270381 A1* | 9/2016 | Saito | .................... | A01K 89/006 |

FOREIGN PATENT DOCUMENTS

| | | | |
|---|---|---|---|
| JP | S55-90285 U | 6/1980 | |
| JP | H10210901 A | 8/1998 | |

\* cited by examiner

ROTATION TRANSMISSION MECHANISM FOR SPINNING REEL

CROSS-REFERENCE TO RELATED APPLICATIONS

This application claims priority to Japanese Patent Application No. 2016-099944 filed on May 18, 2016, the entirety of which is hereby incorporated by reference in its entirety.

BACKGROUND

Technical Field

The present disclosure relates to a rotation transmission mechanism for a spinning reel, and particularly to a rotation transmission mechanism for a spinning reel, which is mounted to a reel unit including a chassis and a lid member.

Background Information

A spinning reel is provided with a rotation transmission mechanism in its reel unit (see Japan Laid-open Patent Application Publication No. H10-210901). The rotation transmission mechanism includes a drive shaft, a drive gear and a pinion gear. The drive shaft is rotatable with respect to the reel unit. When described in detail, the drive shaft is supported by a first bearing and a second bearing. The first bearing is mounted to a chassis, whereas the second bearing is mounted to a lid member. The drive gear is unitarily rotatable with the drive shaft. The pinion gear is meshed with the drive gear. The pinion gear is disposed in a direction skew to the drive shaft and is rotatably supported by the chassis. In this construction, adjuster members (a ring member and a slide washer) are disposed between the second bearing and the drive gear in order to adjust a meshing condition between the drive gear and the pinion gear.

In this type of rotation transmission mechanism, during its assemblage, the adjuster members are disposed between the second bearing and the drive gear. By thus disposing the adjuster members, axial positioning is done for the drive shaft which is unitarily rotatable with the drive gear. Then, it is determined whether or not the drive gear and the pinion gear are appropriately meshed (e.g., how much a rotor wobbles while rotating, how much force is required to rotate the rotor, etc.) by rotating a handle after assemblage of the rotation transmission mechanism. When the drive gear and the pinion gear are not appropriately meshed, the lid member is detached from the chassis and the adjuster members are adjusted for readjustment of the meshing condition between the drive gear and the pinion gear. In this case, for instance, the thickness and/or the number of the adjuster members are/is changed.

In the well-known rotation transmission mechanism, the adjuster members are disposed between the drive gear and the second bearing mounted to the lid member in order to adjust the meshing condition between the drive gear and the pinion gear. Therefore, when the meshing condition between the drive gear and the pinion gear is readjusted, the lid member is required to be detached from the chassis. Then, after the readjustment of the meshing condition, the lid member is required to be reattached to the chassis.

In this case, it is concerning that accuracy in attachment of the lid member to the chassis affects accuracy in mesh between the drive gear and the pinion gear. Specifically, even when the thickness and/or the number of the adjuster members are/is adjusted, chances are that the lid member cannot be attached to the chassis with acceptable accuracy. When the lid member cannot be attached to the chassis with acceptable accuracy, readjustment is possibly required for the meshing condition between the drive gear and the pinion gear.

Additionally, whenever the meshing condition between the drive gear and the pinion gear is readjusted, it is required, as described above, to disassemble and reassemble the lid member and the chassis. Hence, this also poses a concern about degradation in workability.

BRIEF SUMMARY

The present disclosure has been produced in view of the aforementioned drawbacks. It is an object of the present disclosure to provide a rotation transmission mechanism for a spinning reel, in which a meshing condition between a drive gear and a pinion gear is easily adjustable.

(1) A rotation transmission mechanism for a spinning reel according to an aspect of the present disclosure is mounted to a reel unit including a chassis and a lid member. The present rotation transmission mechanism includes a drive shaft, a drive gear, a pinion gear, a first bearing and a positioning structure. The drive shaft is rotatable with respect to the chassis. The drive gear is unitarily rotatable with the drive shaft. The pinion gear is rotatably mounted to the chassis and is disposed in a skew direction to the drive shaft. The pinion gear is meshed with the drive gear. The first bearing is mounted to the chassis. The first bearing is disposed between the chassis and the drive shaft, and supports the drive shaft such that the drive shaft is rotatable. The positioning structure is mounted to an end of the drive shaft. The positioning structure positions the drive shaft with respect to the first bearing.

In the present rotation transmission mechanism, the positioning structure positions the drive shaft with respect to the first bearing mounted to the chassis, while the pinion gear is rotatably supported by the chassis. Accordingly, when the lid member is mounted to the chassis, the drive shaft is positioned with respect to the first bearing (i.e., the chassis) by the positioning structure while the pinion gear is rotatably supported by the chassis. By thus constructing the rotation transmission mechanism, a meshing condition between the drive gear and the pinion gear is easily adjustable while the lid member is mounted to the chassis.

(2) In a rotation transmission mechanism for a spinning reel according to another aspect of the present disclosure, the positioning structure can include a mount part and an engaging part. The mount part is mounted to the end of the drive shaft. The engaging part is provided on the mount part. The engaging part can be engaged with the first bearing from the same side as the end of the drive shaft. By thus constructing the positioning structure, the drive shaft can be positioned with respect to the first bearing with a simple construction.

(3) In a rotation transmission mechanism for a spinning reel according to yet another aspect of the present disclosure, the positioning structure can include a spacer. The spacer is disposed between the engaging part and the first bearing. The engaging part is engaged with the first bearing through the spacer. In this construction, the drive shaft can be suitably positioned with respect to the first bearing by disposing the spacer between the engaging part and the first bearing.

(4) In a rotation transmission mechanism for a spinning reel according to further yet another aspect of the present disclosure, the pinion gear can be disposed between the drive gear and the first bearing in an axial direction of the drive shaft. By thus disposing the rotation transmission mechanism, the drive gear can be suitably meshed with the pinion gear when the drive shaft is positioned with respect to the first bearing by the positioning structure.

(5) A rotation transmission mechanism for a spinning reel according to still yet another aspect of the present disclosure can further include a second bearing. The second bearing is disposed between the lid member and the drive shaft, and supports the drive shaft such that the drive shaft is rotatable. With this construction, the drive shaft can be rotatably supported by the chassis through the first bearing and by the lid member through the second bearing.

(6) In a rotation transmission mechanism for a spinning reel according to further still yet another aspect, the drive gear can be disposed between the first bearing and the second bearing in the axial direction of the drive shaft. The second bearing and the drive gear can be separated by a gap. In this construction, the drive shaft is positioned with respect to the first bearing by the positioning structure. Hence, unlike a well-known construction, it is not herein required to dispose an adjustment member between the second bearing and the drive gear. Therefore, the meshing condition between the drive gear and the pinion gear is easily adjustable while the lid member is mounted to the chassis.

Overall, according to the present disclosure, the meshing condition between the drive gear and the pinion gear is easily adjustable in the rotation transmission mechanism for a spinning reel.

BRIEF DESCRIPTION OF THE DRAWINGS

Referring now to the attached drawings which form a part of this original disclosure.

DETAILED DESCRIPTION OF EMBODIMENTS

<Entire Construction of Spinning Reel>

A spinning reel 1 employing a preferred embodiment of the present disclosure can be mounted to a fishing rod and can forwardly release a fishing line.

Figure 1:
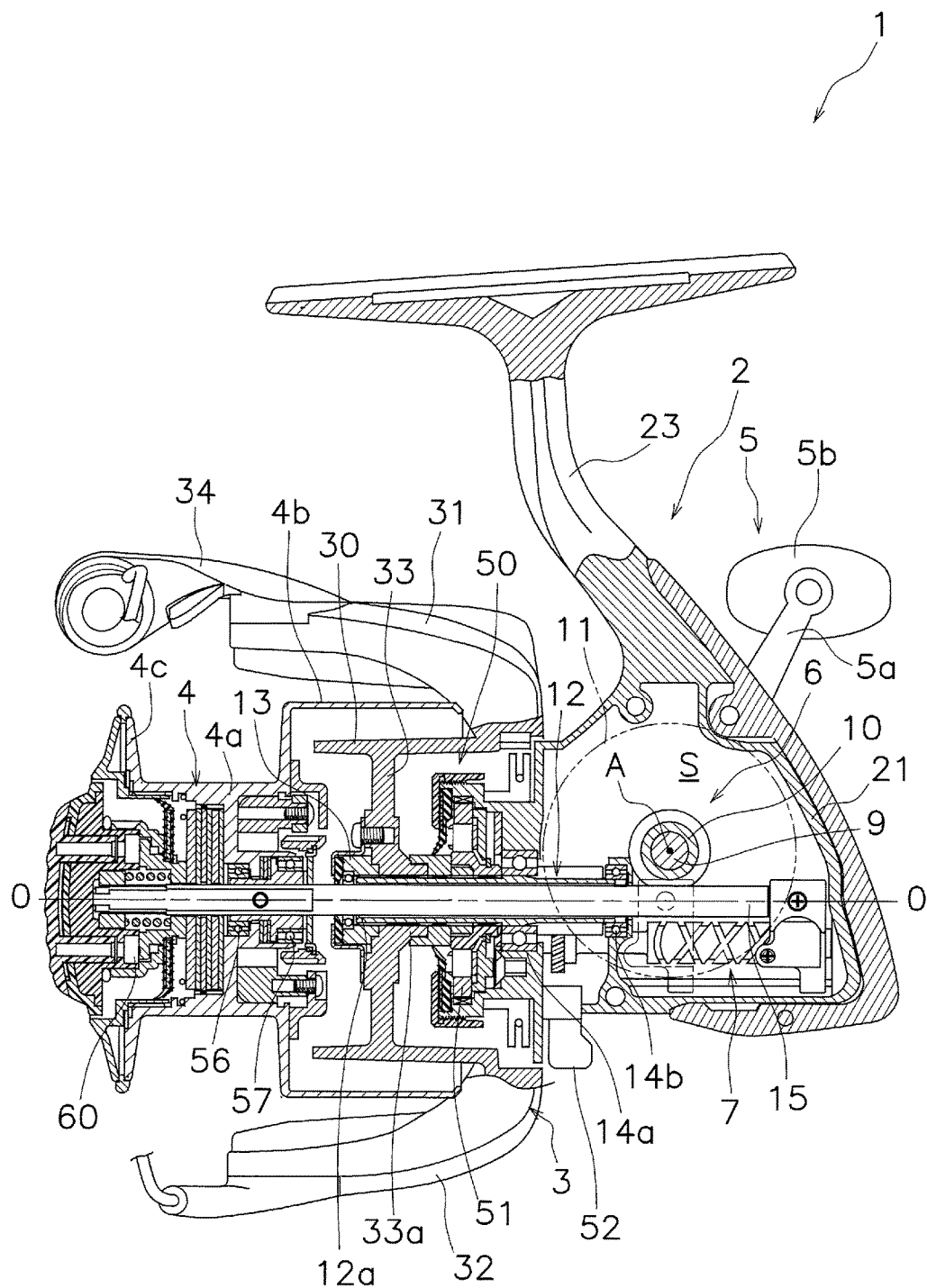
FIG. 1 is a cross-sectional side view of a spinning reel employing a preferred embodiment of the present disclosure.
Figure 2:
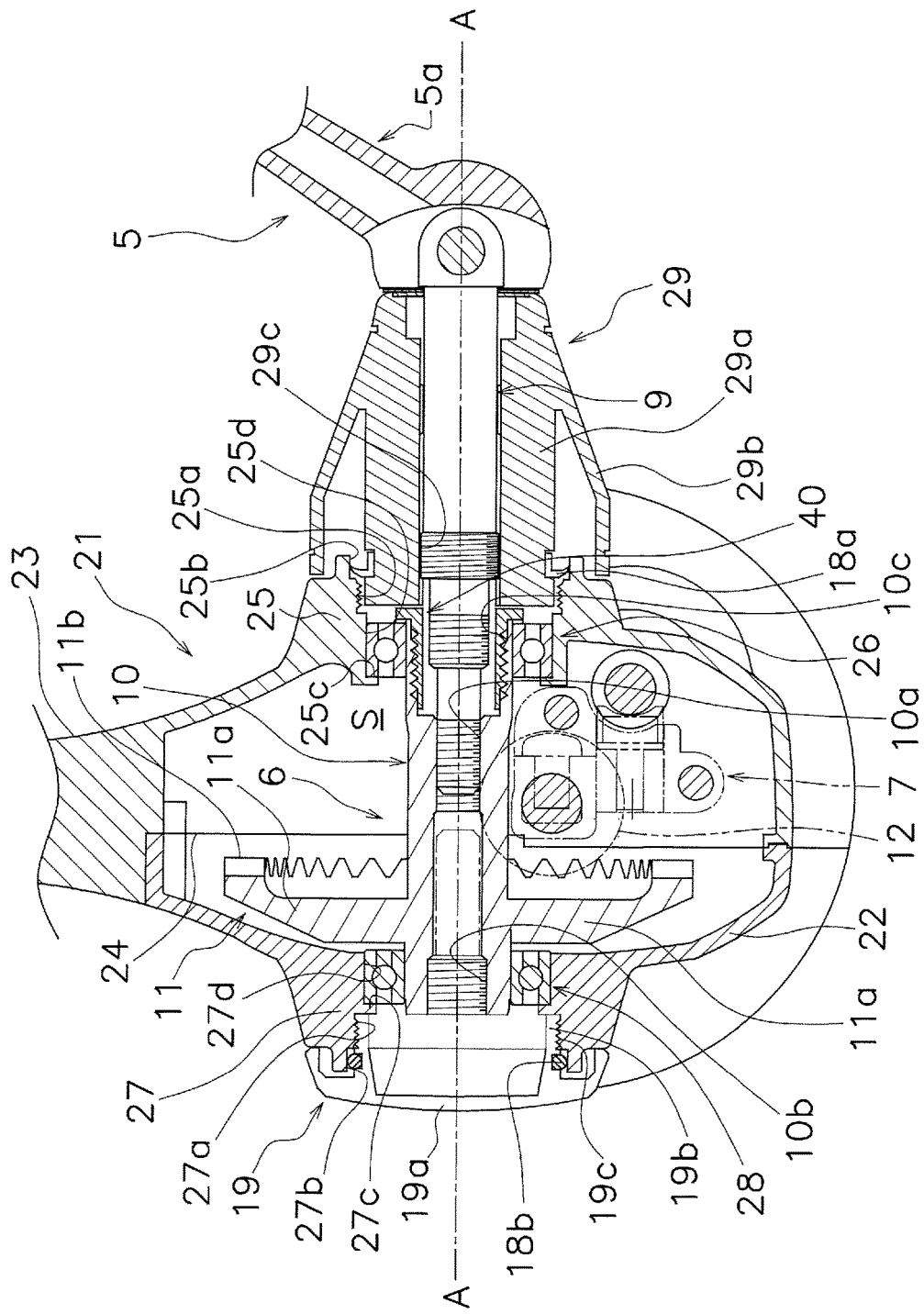
FIG. 2 is a cross-sectional rear view of the spinning reel.

As shown in FIGS. 1 and 2, the present spinning reel 1 includes a reel unit 2, a rotor 3, a spool 4, a handle assembly 5 and a rotation transmission mechanism 6.

Here, axial line O-O shown in FIG. 1 indicates a common rotational axis for the rotor 3 and the spool 4. Axial line O-O also indicates an axis of a spool shaft 15 to which the spool 4 is mounted. Axial line A-A shown in FIG. 2 indicates a rotational axis of the rotation transmission mechanism 6, for instance, a common rotational axis for a handle shaft 9 and a drive shaft 10.

A direction along an axis O, a direction separating from the axis O and a direction about the axis O will be hereinafter referred to as "first axial direction", "first radial direction" and "first circumferential direction", respectively, on an as-needed basis. On the other hand, a direction along an axis A, a direction separating from the axis A and a direction about the axis A will be referred to as "second axial direction", "second radial direction" and "second circumferential direction", respectively, on an as-needed basis.

It should be noted that the second axial direction is a direction skew to the first axial direction. Axial line A-A is arranged in parallel to a plane including axial line O-O, and a straight line obtained by projecting axial line A-A onto this plane is arranged orthogonally to axial line O-O.

<Construction of Reel Unit>

The reel unit 2 is mountable to the fishing rod. As shown in FIGS. 1 and 2, the reel unit 2 includes a reel body 21, a lid member 22 and a rod attachment leg 23.

(Reel Body)

As shown in FIGS. 1 and 2, the reel body 21 includes an internal space S and an opening 24 (see FIG. 2). The rotation transmission mechanism 6 is disposed in the internal space S of the reel body 21. Additionally, an oscillating mechanism 7 is disposed in the internal space S in order to evenly wind the fishing line about the spool 4. The opening 24 is provided in the reel body 21. When described in detail, the opening 24 is provided in a lateral part of the reel body 21. The rotation transmission mechanism 6 and the oscillating mechanism 7 are inserted into the reel body 21 through the opening 24 and are thus disposed in the internal space S.

As shown in FIG. 2, the reel body 21 is provided with a first boss 25 on a lateral part of the reel body 21 (a right part of the reel body 21 in FIG. 2). The first boss 25 is a boss provided on a side to which the handle assembly 5 is mounted. The first boss 25 has a substantially tubular shape and extends in the second axial direction.

The first boss 25 accommodates a first bearing 26. The first bearing 26 is mounted to the first boss 25 and supports one end of the drive shaft 10 to be described. The first bearing 26 will be explained below in explaining the rotation transmission mechanism 6.

The first boss 25 includes a female threaded part 25a, a first seal hole 25b, a first inner wall 25c and a first bearing accommodating hole 25d.

The female threaded part 25a is shaped to enable a waterproof cap 19 to be screwed into the female threaded part 25a. The inner diameter (i.e., the crest or minor diameter) of the female threaded part 25a is larger than the outer diameter of the first bearing 26 (a first outer race 26a to be described). In other words, the inner diameter of the female threaded part 25a is larger than that of the first bearing accommodating hole 25d.

The first seal hole 25b is provided on the outer side (i.e., an external space side) of the female threaded part 25a in the second axial direction. The inner diameter of the first seal hole 25b is larger than the root or major diameter of the female threaded part 25a. A first seal member 18a is disposed between the first seal hole 25b and a shaft part 29a of a tubular member 29 (to be described) in the second radial direction.

The first inner wall 25c is provided on the inner peripheral part of the first boss 25. The first inner wall 25c has a substantially annular shape. The first bearing 26 (the first outer race 26a to be described) contacts the inner wall 25c. When described in detail, the first outer race 26a of the first bearing 26 contacts the first inner wall 25c from the handle assembly 5 side.

The first bearing accommodating hole 25d accommodates the first bearing 26. The first bearing accommodating hole 25d is provided on the inner side (i.e., an internal space side) of the female threaded part 25a in the second axial direction. The inner diameter of the first bearing accommodating hole 25d is larger than the outer diameter of the drive shaft 10.

Additionally, the inner diameter of the first bearing accommodating hole 25d is smaller than that of the female threaded part 25a.

(Lid Member)

As shown in FIG. 2, the lid member 22 is mounted to the reel body 21. When described in detail, the lid member 22 is mounted to the reel body 21 so as to close the opening 24 of the reel body 21.

The lid member 22 is provided with a second boss 27. The second boss 27 is a boss provided on the opposite side of the side to which the handle assembly 5 is mounted. The second boss 27 is provided on the lid member 22 so as to be opposable to the first boss 25 in the second axial direction. The second boss 27 has a substantially tubular shape and extends in the second axial direction.

The second boss 27 accommodates a second bearing 28. The second bearing 28 is mounted to the second boss 27 and supports the other end of the drive shaft 10. The second bearing 28 will be explained below in explaining the rotation transmission mechanism 6.

The second boss 27 includes a female threaded part 27a, a second seal hole 27b, a second inner wall 27c and a second bearing accommodating hole 27d.

The female threaded part 27a is shaped to enable the waterproof cap 19 to be screwed into the female threaded part 27a. The inner diameter (i.e., the crest or minor diameter) of the female threaded part 27a is larger than the outer diameter of the second bearing 28 (a second outer race 28a to be described). In other words, the inner diameter of the female threaded part 27a is larger than that of the second bearing accommodating hole 27d.

The second seal hole 27b is provided on the outer side of the female threaded part 27a in the second axial direction. The inner diameter of the second seal hole 27b is larger than the root or major diameter of the female threaded part 27a. A second seal member 18b is disposed between the second seal hole 27b and a tubular part 19b (to be described) of the waterproof cap 19 in the second radial direction.

The second inner wall 27c is provided on the inner peripheral part of the second boss 27. The second inner wall 27c has a substantially annular shape. The second bearing 28 contacts the second inner wall 27c. When described in detail, the second outer race 28a of the second bearing 28 contacts the second inner wall 27c from the drive gear 11 side.

The second bearing accommodating hole 27d accommodates the second bearing 28. The second bearing accommodating hole 27d is provided on the inner side (i.e., the internal space side) of the female threaded part 27a in the second axial direction. The inner diameter of the second bearing accommodating hole 27d is larger than the outer diameter of the drive shaft 10. Additionally, the inner diameter of the second bearing accommodating hole 27d is smaller than the inner diameter of the female threaded part 27a.

Figure 3:
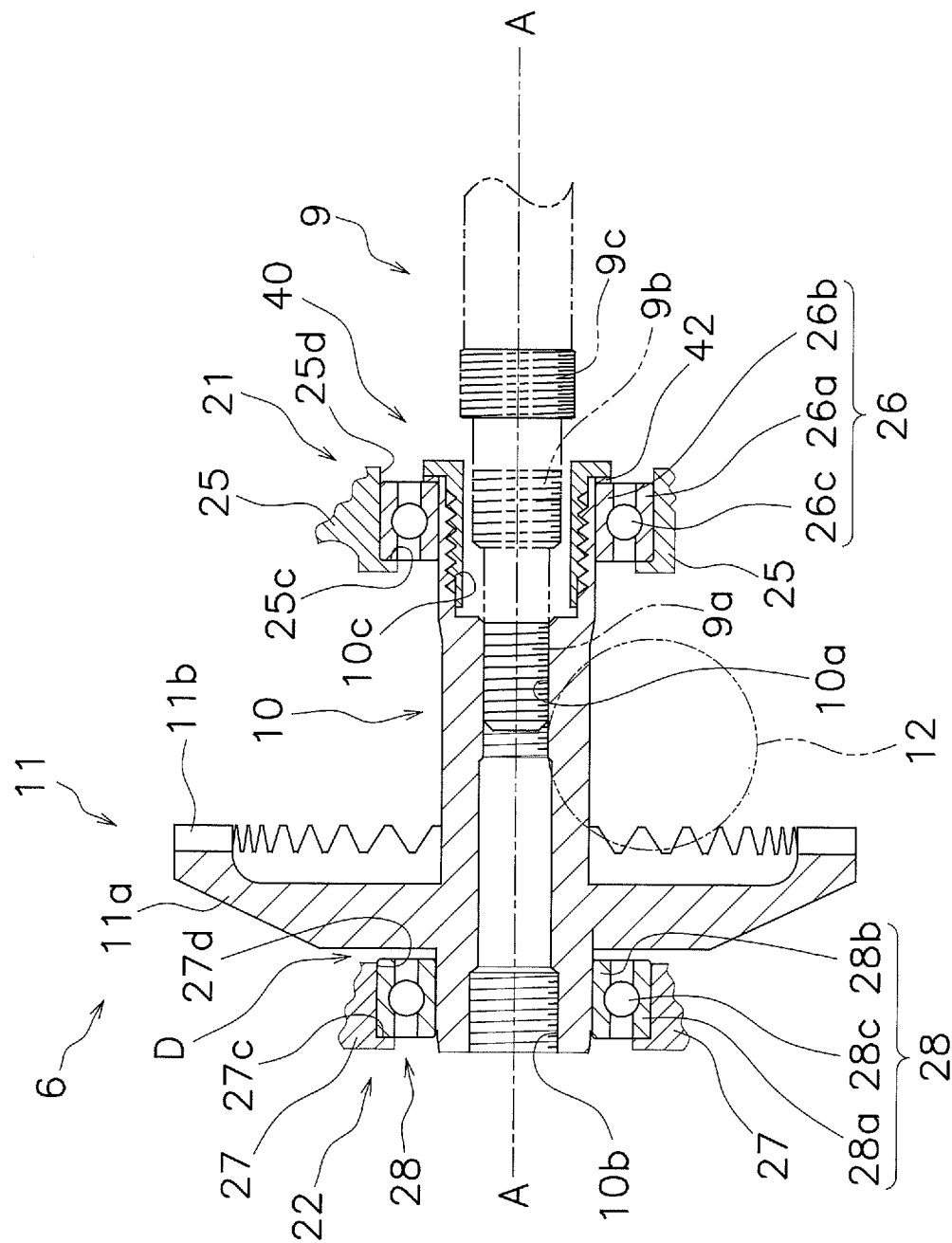
FIG. 3 is an enlarged cross-sectional view of a rotation transmission mechanism.

As shown in FIGS. 2 and 3, the second boss 27 is closed by the waterproof cap 19. The waterproof cap 19 includes a cover part 19a and the tubular part 19b. The cover part 19a has a saucer shape. The tubular part 19b protrudes from the cover part 19a. The tubular part 19b is provided with a male threaded part 19c on the outer peripheral surface of a tip of the tubular part 19b. The male threaded part 19c can be screwed into either of the female threaded parts 25a and 27a.

In the example herein described, the handle assembly 5 is mounted to the first boss 25. However, the handle assembly 5 is mountable to the second boss 27 as well. In this case, the waterproof cap 19 is screwed into the female threaded part 25a of the first boss 25.

(Rod Attachment Leg)

As shown in FIGS. 1 and 2, the rod attachment leg 23 is mounted to the fishing rod. The rod attachment leg 23 is integrated with the reel body 21 and extends obliquely upward from the reel body 21. The rod attachment leg 23 herein has a T-shape.

<Construction of Oscillating Mechanism>

As shown in FIG. 1, the oscillating mechanism 7 is a mechanism for moving the spool 4 in the first axial direction (e.g., a back-and-forth direction). When described in detail, the oscillating mechanism 7 is a mechanism that moves the spool shaft 15 in the first axial direction (e.g., the back-and-forth direction) so as to move the spool 4 coupled to the spool shaft 15 in the same direction as the moving direction of the spool shaft 15. The oscillating mechanism 7 operates in conjunction with rotation of a pinion gear 12 so as to move the spool 4 back and forth in synchronization with rotation of the rotor 3. The spool shaft 15 is herein disposed in the center part of the spool 4 and is coupled to the spool 4 through a drag mechanism 60.

<Construction of Rotor>

As shown in FIG. 1, the rotor 3 is rotatable at the front part of the reel unit 2. The rotor 3 is rotated in conjunction with rotation of the drive shaft 10 to be described.

The rotor 3 includes a cylindrical part 30, a first rotor arm 31 and a second rotor arm 32. The first and second rotor arms 31 and 32 are disposed outward of the cylindrical part 30 and are opposed to each other. The cylindrical part 30 and the first and second rotor arms 31 and 32 are integrally molded. A bail arm 34 is mounted to the tip ends of the first and second rotor arms 31 and 32 in order to lead the fishing line to the spool 4. The bail arm 34 can take an opened position and a closed position.

The cylindrical part 30 is provided with a front wall 33 in a front part of the cylindrical part 30. The front wall 33 is provided with a boss 33a on a middle part of the front wall 33. The boss 33a is provided with a through hole in a center part of the boss 33a. A front part 12a of the pinion gear 12 and the spool shaft 15 are inserted through the through hole. The pinion gear 12 is non-rotatably locked to the front wall 33 by a nut 13 on the front side of the through hole. An anti-reverse mechanism 50 is disposed in the interior of the cylindrical part 30 of the rotor 3 in order to prevent or allow reverse rotation of the rotor 3. The anti-reverse mechanism 50 includes a one-way clutch 51 and a switch mechanism 52. The one-way clutch 51 is of a roller type that an inner race idles. The switch mechanism 52 switches the one-way clutch 51 between an activation state (a reverse rotation preventing state) and a deactivation state (a reverse rotation allowing state).

<Construction of Spool>

The spool 4 is movable in the first axial direction with respect to the reel unit 2. The fishing line is wound about the spool 4 by rotation of the rotor 3.

As shown in FIG. 1, the spool 4 is disposed between the first rotor arm 31 and the second rotor arm 32 of the rotor 3. The spool 4 is mounted to the tip end of the spool shaft 15 through the drag mechanism 60.

The spool 4 includes a bobbin trunk 4a, a skirt 4b and a flange 4c. The bobbin trunk 4a is a part about which the fishing line is wound on an outer periphery of the bobbin trunk 4a. The skirt 4b is disposed on the back side of the bobbin trunk 4a and is integrated with the bobbin trunk 4a. The flange 4c is fixed to the front end of the bobbin trunk 4a. The bobbin trunk 4a has a substantially cylindrical shape. The outer peripheral surface of the bobbin trunk 4a is composed of a circumferential surface disposed in parallel to the spool shaft 15. The bobbin trunk 4a is rotatably mounted to the spool shaft 15 through two bearings 56 and 57.

<Construction of Handle Assembly>

The handle assembly 5 is unitarily rotatable with the drive shaft 10 to be described. The handle assembly 5 is detachably mounted to either of one end and the other end of the drive shaft 10 and is unitarily rotatable with the drive shaft 10.

As shown in FIGS. 1 and 2, the handle assembly 5 includes a handle arm 5a, a handle knob 5b, the handle shaft 9 (see FIG. 1) and the tubular member 29.

The handle arm 5a is pivotably coupled to the handle shaft 9. The handle knob 5b is mounted to the tip end of the handle arm 5a (see FIG. 1).

The handle shaft 9 is unitarily rotatable with the drive shaft 10. The handle shaft 9 is screwed into either a first female threaded part 10a or a second female threaded part 10b of the drive shaft 10 to be described.

As shown in FIG. 3, the handle shaft 9 includes a first male threaded part 9a, a second male threaded part 9b and a third male threaded part 9c. The first male threaded part 9a is of a right-hand thread type and is screwed into the first female threaded part 10a. The second male threaded part 9b is of a left-hand thread type and is screwed into the second female threaded part 10b. The third male threaded part 9c is screwed into a third female threaded part 29c (to be described) of the tubular member 29.

The first male threaded part 9a is provided such that the handle shaft 9 is mounted to the drive shaft 10 from one end side and is unitarily rotatable with the drive shaft 10. The first male threaded part 9a is provided on the tip end of the handle shaft 9 in the second axial direction.

The second male threaded part 9b is provided such that the handle shaft 9 is mounted to the drive shaft 10 from the other end side and is unitarily rotatable with the drive shaft 10. The second male threaded part 9b is provided on the handle shaft 9 and is located closer to the handle arm 5a than the first male threaded part 9a in the second axial direction. When described in detail, the second male threaded part 9b is provided on the handle shaft 9 and is located between the first male threaded part 9a and the third male threaded part 9c in the second axial direction.

The third male threaded part 9c is provided such that the handle assembly 5 is mounted to the handle shaft 9 and is unitarily rotatable with the handle shaft 9. The third male threaded part 9c is provided on the handle shaft 9 and is located closer to the handle arm 5a than the second male threaded part 9b in the second axial direction.

As shown in FIG. 2, the tubular member 29 is unitarily rotatable with the handle shaft 9. The tubular member 29 is disposed on the outer peripheral side of the handle shaft 9. When described in detail, the tubular member 29 is disposed between the reel body 21 and the handle arm 5a in the second axial direction. The tubular member 29 is disposed on the outer peripheral side of the handle shaft 9 in the second radial direction.

The tubular member 29 includes the shaft part 29a and a cover part 29b. The shaft part 29a has a substantially cylindrical shape. The handle shaft 9 is inserted through the inner peripheral part of the shaft part 20a. When described in detail, the third female threaded part 29c is provided on the inner peripheral surface of the shaft part 29a. The third male threaded part 9c of the handle shaft 9 is screwed into the third female threaded part 29c.

<Construction of Rotation Transmission Mechanism>

As shown in FIGS. 2 and 3, the rotation transmission mechanism 6 includes the drive shaft 10, the drive gear 11, the pinion gear 12, the aforementioned first and second bearings 26 and 28, and a positioning structure 40.

(Drive Shaft)

The drive shaft 10 is unitarily rotatable with the handle assembly 5. When described in detail, the drive shaft 10 is unitarily rotatable with the handle shaft 9. As shown in FIGS. 2 and 3, the handle shaft 9 is screwed into the drive shaft 10.

The drive shaft 10 has a substantially tubular shape. The drive shaft 10 includes the first female threaded part 10a, the second female threaded part 10b, and a fourth female threaded part 10c. The first female threaded part 10a is provided on the inner peripheral surface of a middle part of the drive shaft 10. For example, the first female threaded part 10a can be of a right-hand thread type. The first male threaded part 9a of the handle shaft 9 is screwed into the first female threaded part 10a.

The second female threaded part 10b is provided on the inner peripheral surface of the other end (the left end in FIG. 3) of the drive shaft 10. For example, the second female threaded part 10b can be of a left-hand thread type. The second male threaded part 9b of the handle shaft 9 is screwed into the second female threaded part 10b.

The fourth female threaded part 10c is provided on the inner peripheral surface of one end (the right end in FIG. 3) of the drive shaft 10. For example, the fourth female threaded part 10c can be of a right-hand thread type. A positioning member 41 (e.g., a fourth male threaded part 41c) of the positioning structure 40 is screwed into the fourth female threaded part 10c. It should be noted that the fourth female threaded part 10c can be, for instance, of a left-hand thread type.

Additionally, the drive shaft 10 is rotatable with respect to the reel body 21 and the lid member 22. When described in detail, the drive shaft 10 is supported by the reel body 21 and the lid member 22 through the first bearing 26 and the second bearing 28 and is rotatable with respect to the reel body 21 and the lid member 22.

Moreover, the drive shaft 10 is positioned with respect to the reel body 21 by the positioning structure 40. When described in detail, the drive shaft 10 is positioned with respect to the first bearing 26, i.e., the reel body 21 by the positioning structure 40.

(Drive Gear)

The drive gear 11 is a member for transmitting rotation of the drive shaft 10 to the pinion gear 12. The drive gear 11 is unitarily rotatable with the drive shaft 10. Additionally, the drive gear 11 can be meshed with the pinion gear 12.

As shown in FIG. 2, the drive gear 11 is integrated with the drive shaft 10. The drive gear 11 is disposed between the first bearing 26 and the second bearing 28 in the second axial direction. A gap D is produced between the drive gear 11 and the second bearing 28 in the second axial direction (see FIG. 3).

Specifically, the drive gear 11 includes a gear body 11a and gear teeth 11b. The gear body 11a is provided on the outer peripheral side of the drive shaft 10 so as to be unitarily rotatable with the drive shaft 10. The gear body 11a has a substantially disc shape. The gear body 11a is disposed adjacently to the second bearing 28 and is disposed between the first bearing 26 and the second bearing 28 in the second axial direction. The gap D is produced between the gear body 11a and the second bearing 28 in the second axial direction (see FIG. 3).

The gear teeth 11b are meshed with the pinion gear 12. The gear teeth 11b are provided on the outer peripheral part of the gear body 11a. The gear teeth 11b are provided on one surface of the gear body 11a in the second axial direction. When described in detail, the gear teeth 11b protrude from the outer peripheral part of the gear body 11a in the second axial direction, and are disposed on the outer peripheral part of the gear body 11a in alignment in the second circumferential direction. The gear teeth 11b are made in the shape of, for instance, a face gear.

(Pinion Gear)

As shown in FIGS. 1 and 2, the pinion gear 12 can be meshed with the drive gear 11. The pinion gear 12 can be meshed with the oscillating mechanism 7. The pinion gear 12 has a substantially tubular shape. The spool shaft 15 is inserted through the inner peripheral part of the pinion gear 12.

The pinion gear 12 is mounted to the reel unit 2 and is rotatable about the spool shaft 15. When described in detail, the pinion gear 12 is disposed in the first axial direction (an exemplary direction skew to a drive shaft) and is supported so as to be rotatable with respect to the reel body 21. In other words, the pinion gear 12 is positioned with respect to the reel body 21 in the first axial direction, and is supported so as to be rotatable with respect to the reel body 21. Additionally, the pinion gear 12 is disposed between the drive gear 11 and the first bearing 26 in the second axial direction (see FIG. 3).

As shown in FIG. 1, the pinion gear 12 penetrates the center part of the rotor 3. The pinion gear 12 is fixed to the rotor 3 by the nut 13. The pinion gear 12 is rotatably supported at an intermediate part of the pinion gear 12 and a rear end of the pinion gear 12 in the first axial direction by the reel body 21. When described in detail, the pinion gear 12 is rotatably supported by the reel body 21 through bearings 14a and 14b.

The pinion gear 12 is provided with gear teeth (not shown in the drawings). The gear teeth are meshed with the drive gear 11 (e.g., the gear teeth 11b of the drive gear 11). The gear teeth are provided on the outer peripheral part of the pinion gear 12. When described in detail, the gear teeth are provided on the outer peripheral surface of the pinion gear 12 in the first circumferential direction and are integrated with the outer peripheral surface of the pinion gear 12. The gear teeth are herein made in the shape of, for instance, a helical gear.

(First Bearing and Second Bearing)

As shown in FIG. 3, the first bearing 26 is mounted to the reel body 21. The first bearing 26 is disposed between the reel body 21 and the drive shaft 10 and supports the drive shaft 10 such that the drive shaft 10 is rotatable.

When described in detail, the first bearing 26 is mounted to the first boss 25 of the reel body 21. The first bearing 26 is disposed between one end (the right end in FIG. 3) of the drive shaft 10 and the first boss 25 (the first bearing accommodating hole 25d) in the second radial direction and supports the drive shaft 10 such that the drive shaft 10 is rotatable.

The first bearing 26 includes the first outer race 26a, a first inner race 26b and at least one first rolling element 26c. The first outer race 26a is mounted to the first bearing accommodating hole 25d of the first boss 25 provided on the reel body 21. The first inner race 26b is mounted to the one end of the drive shaft 10. The at least one first rolling element 26c is disposed between the first outer race 26a and the first inner race 26b. In other words, the first bearing 26 is a rolling-element bearing (e.g., a ball bearing). The first outer race 26a contacts the first inner wall 25c of the reel body 21 in the second axial direction. The first inner race 26b contacts a washer 42 of the positioning structure 40 to be described.

As shown in FIG. 3, the second bearing 28 is mounted to the lid member 22. The second bearing 28 is disposed between the lid member 22 and the drive shaft 10, and supports the drive shaft 10 such that the drive shaft 10 is rotatable. The first bearing 26 and the second bearing 28 are examples of a supporting means for rotatably supporting the drive shaft 10.

When described in detail, the second bearing 28 is mounted to the second boss 27 of the lid member 22. The second bearing 28 is disposed between the other end (the left end in FIG. 3) of the drive shaft 10 and the second boss 27 (the second bearing accommodating hole 27d) in the second radial direction, and supports the drive shaft 10 such that the drive shaft 10 is rotatable.

The second bearing 28 includes the second outer race 28a, a second inner race 28b and at least one second rolling element 28c. The second outer race 28a is mounted to the second bearing accommodating hole 27d of the second boss 27 provided on the lid member 22. The second inner race 28b is mounted to the other end of the drive shaft 10. The at least one second rolling element 28c is disposed between the second outer race 28a and the second inner race 28b. In other words, the second bearing 28 is a rolling-element bearing (e.g., a ball bearing). The second outer race 28a contacts the second inner wall 27c of the lid member 22 in the second axial direction. The gap D is produced between the second inner race 28b and the drive gear 11 in the second axial direction.

(Positioning Structure)

Figure 4:
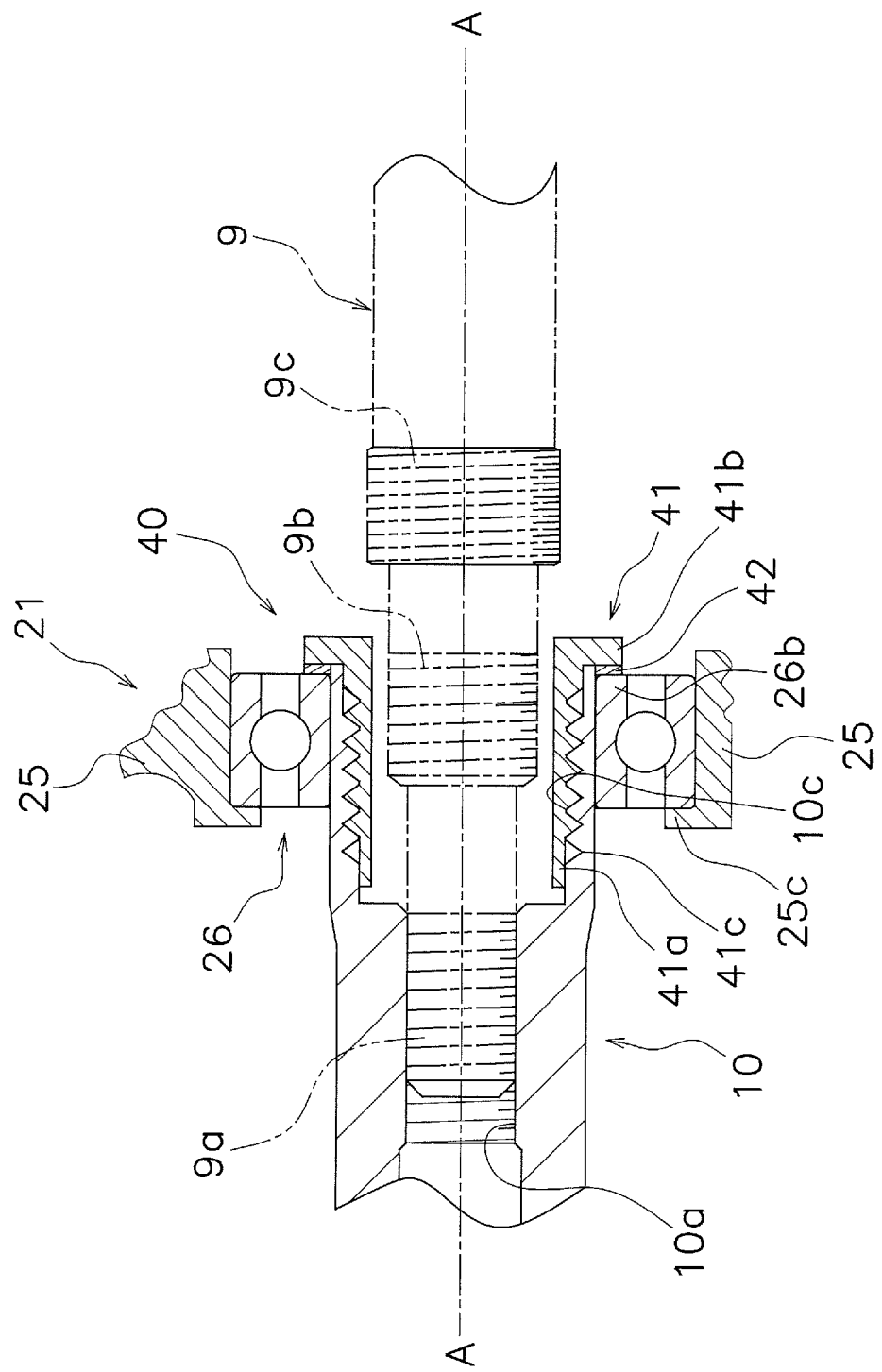
FIG. 4 is an enlarged cross-sectional view of part of the rotation transmission mechanism.

As shown in FIGS. 3 and 4, the positioning structure 40 is mounted to an end of the drive shaft 10, for instance, one end (the right end in FIG. 3) of the drive shaft 10. The positioning structure 40 positions the drive shaft 10 with respect to the first bearing 26. When described in detail, the positioning structure 40 positions the drive shaft 10 with respect to the first bearing 26 whereby the drive gear 11 and the pinion gear 12 are meshed.

The positioning structure 40 includes the positioning member 41 and the washer 42 (an exemplary spacer). The positioning member 41 includes a mount tubular part 41a (an exemplary mount part) and a brim part 41b (an exemplary engaging part).

The mount tubular part 41a has a substantially tubular shape. The mount tubular part 41a is mounted to the one end of the drive shaft 10. The mount tubular part 41a includes the fourth male threaded part 41c. The fourth male threaded part 41c is provided on the outer peripheral surface of the mount tubular part 41a. For example, the fourth male threaded part 41c can be of a right-hand thread type. The fourth male threaded part 41c is screwed into the fourth female threaded part 10c of the drive shaft 10.

The brim part 41b can be engaged with the first bearing 26. When described in detail, the brim part 41b can be engaged with the first bearing 26 from the same side as the one end of the drive shaft 10. The brim part 41b is herein engaged with the first bearing 26 through the washer 42 from the handle assembly side.

Specifically, the brim part 41b is provided on the mount tubular part 41a. When described in detail, the brim part 41b is integrated with the mount tubular part 41a while protruding radially outside from the outer peripheral surface of an end of the mount tubular part 41a.

The brim part 41b is disposed in opposition to the one end of the drive shaft 10 in the second axial direction. The brim part 41*b* is disposed in opposition to the first bearing 26 (e.g., the first inner race 26*b*) in the second axial direction. The washer 42 is disposed between the brim part 41*b* and the first inner race 26*b* of the first bearing 26 in the second axial direction.

The washer 42 has a substantially annular disc shape. The washer 42 is disposed on the outer peripheral side of the one end of the drive shaft 10. The washer 42 is disposed between the brim part 41*b* and the first bearing 26 in the second axial direction.

When described in detail, the brim part 41*b* presses the washer 42 toward the first inner race 26*b* of the first bearing 26, while the first outer race 26*a* of the first bearing 26 contacts the first inner wall 25*c* of the reel body 21 in the second axial direction.

With the positioning structure 40 thus constructed, the drive shaft 10 is positioned with respect to the reel body 21 through the first bearing 26, and is meshed with the pinion gear 12.

<Adjustment for Meshing Condition Between Drive Gear and Pinion Gear>

In the spinning reel 1 having the aforementioned construction, the meshing condition between the drive gear 11 and the pinion gear 12 is adjusted during assemblage. The meshing adjustment is done as follows.

Specifically, the lid member 22 including the second bearing 28 is mounted to the reel body 21, while the rotation transmission mechanism 6 excluding the second bearing 28 is disposed in the internal space of the reel body 21. Accordingly, the drive shaft 10 is rotatably supported by the reel unit 2 through the first bearing 26 mounted to the reel body 21 and the second bearing 28 mounted to the lid member 22.

In this condition, the washer 42 is firstly disposed on the outer peripheral side of the one end of the drive shaft 10. Next, the positioning member 41 is mounted to the one end of the drive shaft 10. When described in detail, while the first bearing 26 (the first outer race 26*a*) contacts the first inner wall 25*c* of the reel body 21, the washer 42 is disposed on the outer peripheral side of the mount tubular part 41*a* of the positioning member 41 and the mount tubular part 41*a* (the fourth male threaded part 41*c*) is screwed into the drive shaft 10 (the fourth female threaded part 10*c*). Accordingly, while the brim part 41*b* of the positioning member 41 contacts the washer 42, the drive shaft 10 is moved toward the brim part 41*b* until the end surface of the one end of the drive shaft 10 contacts the brim part 41*b*. Thus, the drive shaft 10 is positioned in the second axial direction.

Through the aforementioned procedure, the drive shaft 10 is positioned with respect to the first bearing 26, i.e., the reel body 21 by the positioning structure 40 (the positioning member 41 and the washer 42). As a result, the drive gear 11 and the pinion gear 12 are set in a predetermined meshing condition.

Subsequently, the meshing condition between the drive gear 11 and the pinion gear 12 is adjusted. For example, a tool exclusively for meshing adjustment (not shown in the drawings) can be attached to the drive shaft 10. Then, it is determined whether or not the drive gear 11 and the pinion gear 12 are meshed in an appropriate condition by rotating the tool. When it is herein determined that the drive gear 11 and the pinion gear 12 are not meshed in the appropriate condition, the positioning member 41 is detached from the drive shaft 10. The thickness of the washer 42 and/or the number of the washers 42 are/is herein changed. Then, it is again determined whether or not the drive gear 11 and the pinion gear 12 are meshed in the appropriate condition.

Thus, in the rotation transmission mechanism 6 having the aforementioned construction, while the lid member 22 is mounted to the reel body 21, the meshing condition between the drive gear 11 and the pinion gear 12 is easily adjustable by detachment and reattachment of the positioning structure 40 (the positioning member 41 and the washer 42). Additionally, in the rotation transmission mechanism 6 having the aforementioned construction, the gap D is produced between the second bearing 28 and the drive gear 11 in the second axial direction. With the gap D, slide resistance is not generated against the drive gear 11. Hence, the drive shaft 10 can be smoothly rotated.

<Comprehensive Explanation>

The spinning reel 1 having the aforementioned construction can be expressed as follows.

(1) The rotation transmission mechanism 6 for the spinning reel 1 is mounted to the reel unit 2 including the reel body 21 and the lid member 22. The present rotation transmission mechanism 6 includes the drive shaft 10, the drive gear 11, the pinion gear 12, the first bearing 26 and the positioning structure 40. The drive shaft 10 is rotatable with respect to the reel body 21. The drive gear 11 is unitarily rotatable with the drive shaft 10. The pinion gear 12 is rotatably supported by the reel body 21 and is disposed in the skew direction to the drive shaft 10. The pinion gear 12 is meshed with the drive gear 11. The first bearing 26 is mounted to the reel body 21. The first bearing 26 is disposed between the reel body 21 and the drive shaft 10, and supports the drive shaft 10 such that the drive shaft 10 is rotatable. The positioning structure 40 is mounted to one end of the drive shaft 10. The positioning structure 40 positions the drive shaft 10 with respect to the first bearing 26.

In the present rotation transmission mechanism 6, the positioning structure 40 positions the drive shaft 10 with respect to the first bearing 26 mounted to the reel body 21, while the pinion gear 12 is rotatably supported by the reel body 21. Accordingly, when the lid member 22 is mounted to the reel body 21, the drive shaft 10 is positioned with respect to the first bearing 26 (i.e., the reel body 21) by the positioning structure 40 while the pinion gear 12 is rotatably supported by the reel body 21. By thus constructing the rotation transmission mechanism 6, the meshing condition between the drive gear 11 and the pinion gear 12 is easily adjustable while the lid member 22 is mounted to the reel body 12. The positioning structure 40 is an example of an adjusting means for adjusting the meshing condition between the drive gear 11 and the pinion gear 12.

(2) In the rotation transmission mechanism 6 for the spinning reel 1, the positioning structure 40 can include the mount tubular part 41*a* and the brim part 41*b*. The mount tubular part 41*a* is mounted to the one end of the drive shaft 10. The brim part 41*b* is provided on the mount tubular part 41*a*. The brim part 41*b* can be engaged with the first bearing 26 from the same side as the one end of the drive shaft 10. By thus constructing the positioning structure 40, the drive shaft 10 can be positioned with respect to the first bearing 26 with a simple construction.

(3) In the rotation transmission mechanism 6 for the spinning reel 1, the positioning structure 40 can include the washer 42. The washer 42 is disposed between the brim part 41*b* and the first bearing 26. The brim part 41*b* is engaged with the first bearing 26 through the washer 42. In this construction, the drive shaft 10 can be suitably positioned with respect to the first bearing 26 by disposing the washer 42 between the brim part 41*b* and the first bearing 26.

(4) In the rotation transmission mechanism 6 for the spinning reel 1, the pinion gear 12 is disposed between the drive gear 11 and the first bearing 26 in the second axial direction. By thus disposing the rotation transmission mechanism 6, the drive gear 11 can be suitably meshed with the pinion gear 12 when the drive shaft 10 is positioned with respect to the first bearing 26 by the positioning structure 40.

(5) The rotation transmission mechanism 6 for the spinning reel 1 can further include the second bearing 28. The second bearing 28 is disposed between the lid member 22 and the drive shaft 10, and supports the drive shaft 10 such that the drive shaft 10 is rotatable. With this construction, the drive shaft 10 can be rotatably supported by the reel body 21 through the first bearing 26 and by the lid member 22 through the second bearing 28.

(6) In the rotation transmission mechanism 6 for the spinning reel 1, the drive gear 11 can be disposed between the first bearing 26 and the second bearing 28 in the second axial direction. The second bearing 28 and the drive gear 11 can be separated by the gap D. In this construction, the drive shaft 10 is positioned with respect to the first bearing 26 by the positioning structure 40. Hence, unlike a well-known construction, it is not herein required to dispose an adjustment member between the second bearing 28 and the drive gear 11. Therefore, the meshing condition between the drive gear 11 and the pinion gear 12 is easily adjustable while the lid member 22 is mounted to the reel body 21.

Other Preferred Embodiments (a) The aforementioned preferred embodiment has exemplified the spinning reel 1 of a front drag type. However, the present disclosure can be applied to the spinning reel 1 even when the spinning reel 1 is of a rear drag type, a lever brake type, a closed face type or so forth.

(b) The aforementioned preferred embodiment has exemplified the construction that the drive gear 11 and the drive shaft 10 are integrated. However, the drive gear 11 and the drive shaft 10 can be provided as separate members, and the drive gear 11 can be mounted to the drive shaft 10 by fixation means such as a fixation bolt.

(c) The aforementioned preferred embodiment has exemplified the construction that the number of the washers 42 included in the positioning structure 40 is single. However, the number of the washers 42 can be plural.

(d) The aforementioned preferred embodiment has exemplified the construction that the washer 42 has an annular disc shape. However, the washer 42 can have a C-shaped plate shape. With this construction, the washer 42 is attachable/detachable to/from the drive shaft 10 simply by loosening the positioning member 41 screwed into the drive shaft 10. In other words, the washer 42 is attachable/detachable to/from the drive shaft 10 without detaching the positioning member 41 from the drive shaft 10.

(e) The aforementioned preferred embodiment has exemplified the construction that the positioning structure 40 includes the washer 42. However, the brim part 41b of the positioning member 41 can directly contact the first bearing 26 (the first inner race 26b). In this case, the washer 42 is used when adjustment is required for the meshing condition between the drive gear 11 and the pinion gear 12 in the condition that the brim part 41b directly contacts the first bearing 26 (the first inner race 26b).

What is claimed is:

1. A rotation transmission mechanism for a spinning reel, the rotation transmission mechanism mounted to a reel unit including a chassis and a lid member, the rotation transmission mechanism comprising:
    a drive shaft rotatable with respect to the chassis;
    a drive gear unitarily rotatable with the drive shaft;
    a pinion gear rotatably mounted to the chassis and disposed in a skew direction to the drive shaft, the pinion gear meshed with the drive gear;
    a first bearing mounted to the chassis and disposed between the chassis and the drive shaft, the first bearing rotatably supporting the drive shaft; and
    a positioning structure mounted to an end of the drive shaft, the positioning structure to position the drive shaft with respect to the first bearing, the positioning structure having a positioning member partially disposed at an axial outer side of the first bearing.

2. The rotation transmission mechanism according to claim 1, wherein the positioning member includes a mount part and an engaging part, the mount part mounted to the end of the drive shaft, the engaging part being on the mount part, the engaging part to be engaged with the first bearing on a side of the engaging part facing away from the end of the drive shaft.

3. The rotation transmission mechanism according to claim 2, wherein
    the positioning structure includes a spacer, the spacer disposed between the engaging part and the first bearing, and
    the engaging part is engaged with the first bearing through the spacer.

4. The rotation transmission mechanism according to claim 1, wherein the pinion gear is disposed between the drive gear and the first bearing in an axial direction of the drive shaft.

5. The rotation transmission mechanism according to claim 1, further comprising:
    a second bearing disposed between the lid member and the drive shaft, the second bearing rotatably supporting the drive shaft.

6. The rotation transmission mechanism according to claim 5, wherein
    the drive gear is disposed between the first bearing and the second bearing in an axial direction of the drive shaft, and
    the second bearing and the drive gear are separated by a gap.

7. A rotation transmission mechanism for a spinning reel, the rotation transmission mechanism mounted to a reel unit including a chassis and a lid member, the rotation transmission mechanism comprising:
    a drive shaft rotatable with respect to the chassis;
    a drive gear unitarily rotatable with the drive shaft;
    a pinion gear rotatably mounted to the chassis and disposed in a skew direction to the drive shaft, the pinion gear meshed with the drive gear;
    a first bearing mounted to the chassis and disposed between the chassis and the drive shaft, the first bearing rotatably supporting the drive shaft; and
    a positioning structure mounted to an end of the drive shaft, the positioning structure to position the drive shaft along an axial direction of the drive shaft, the positioning structure having a positioning member partially disposed at an axial outer side of the first bearing.

8. The rotation transmission mechanism according to claim 7, wherein the positioning member includes a mount part and an engaging part, the mount part mounted to the end of the drive shaft, the engaging part being on the mount part, the engaging part to be engaged with the first bearing on a side of the engaging part facing away from the end of the drive shaft.

9. The rotation transmission mechanism according to claim 8, wherein
the positioning structure includes a spacer, the spacer disposed between the engaging part and the first bearing, and
the engaging part is engaged with the first bearing through the spacer.

10. The rotation transmission mechanism according to claim 7, wherein the pinion gear is disposed between the drive gear and the first bearing in the axial direction of the drive shaft.

11. The rotation transmission mechanism according to claim 10, further comprising:
a second bearing disposed between the lid member and the drive shaft, the second bearing rotatably supporting the drive shaft.

12. The rotation transmission mechanism according to claim 11, wherein
the drive gear is disposed between the first bearing and the second bearing in the axial direction of the drive shaft, and
the second bearing and the drive gear are separated by a gap.

* * * * *